United States Patent
Chendamarai Kannan et al.

(10) Patent No.: US 10,425,187 B2
(45) Date of Patent: Sep. 24, 2019

(54) UE ASSISTED INTERFERENCE LEARNING

(71) Applicant: QUALCOMM Incorporated, San Diego, CA (US)

(72) Inventors: Arumugam Chendamarai Kannan, San Diego, CA (US); Tao Luo, San Diego, CA (US); Yongbin Wei, La Jolla, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 70 days.

(21) Appl. No.: 14/866,318

(22) Filed: Sep. 25, 2015

(65) Prior Publication Data
US 2016/0099794 A1    Apr. 7, 2016

Related U.S. Application Data

(60) Provisional application No. 62/059,815, filed on Oct. 3, 2014.

(51) Int. Cl.
*H04W 16/14* (2009.01)
*H04L 1/00* (2006.01)
(Continued)

(52) U.S. Cl.
CPC ......... *H04L 1/0035* (2013.01); *H04B 17/345* (2015.01); *H04L 1/0026* (2013.01);
(Continued)

(58) Field of Classification Search
CPC .................................................. H04L 1/0035
See application file for complete search history.

(56) References Cited

U.S. PATENT DOCUMENTS

| | | | | |
|---|---|---|---|---|
| 2009/0124205 | A1* | 5/2009 | Aboba | H04B 17/345 455/63.1 |
| 2012/0236736 | A1* | 9/2012 | Frank | H04W 24/04 370/252 |
| 2014/0233457 | A1* | 8/2014 | Koutsimanis | H04J 11/005 370/328 |

FOREIGN PATENT DOCUMENTS

| | | | |
|---|---|---|---|
| WO | 2013068282 A1 | 5/2013 | |
| WO | 2013110220 A1 | 8/2013 | |
| WO | 2013192160 A1 | 12/2013 | |

OTHER PUBLICATIONS

International Search Report and Written Opinion—PCT/US2015/052721—ISA/EPO—dated Dec. 21, 2015.

* cited by examiner

*Primary Examiner* — Sulaiman Nooristany
(74) *Attorney, Agent, or Firm* — Arent Fox, LLP

(57) ABSTRACT

In an unlicensed band, different types of interference may be experienced by user equipments (UEs), and a serving evolved Node B (eNB) may not be aware of the interference types affecting a UE. Therefore, aspects presented herein provide UE assisted interference learning, in which the UE detects an interfering signal and reports information such as the interference level and properties of the interfering signal to a serving eNB. Another aspects presented herein provide for an eNB which receives, from one or more UEs, information indicating properties of each of at least one interfering signals experienced by the UEs, such as interference types affecting the UEs. The eNB further uses the information received from the UE, including the wireless technology type to determine the properties of its downlink transmission and the length of the contention window leading up to its downlink transmission.

14 Claims, 13 Drawing Sheets

(51) Int. Cl.
*H04B 17/345* (2015.01)
*H04W 72/04* (2009.01)
*H04W 74/08* (2009.01)
H04W 84/04 (2009.01)
H04W 84/12 (2009.01)

(52) U.S. Cl.
CPC ......... *H04W 16/14* (2013.01); *H04W 72/042* (2013.01); *H04W 74/0808* (2013.01); *H04W 84/042* (2013.01); *H04W 84/12* (2013.01)

UE ASSISTED INTERFERENCE LEARNING

CROSS-REFERENCE TO RELATED APPLICATION(S)

This application claims the benefit of U.S. Provisional Application Ser. No. 62/059,815, entitled "UE ASSISTED INTERFERENCE LEARNING" and filed on Oct. 3, 2014, which is expressly incorporated by reference herein in its entirety.

BACKGROUND

Field

The present disclosure relates generally to communication systems, and more particularly, to user equipment (UE) assisted interference learning.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In wireless communication, e.g., using a contention-based shared radio frequency spectrum band, or over different radio frequency spectrum bands (e.g., a licensed radio frequency spectrum band or an unlicensed radio frequency spectrum band) of a cellular network, there may be uncoordinated transmissions of heterogeneous types. Such interference may include, for example, transmissions over an unlicensed band from a public land mobile network (PLMN), Wi-Fi transmissions, etc. In an unlicensed band, different types of interference may be experienced, and a serving evolved Node B (eNB) may not be aware of the interference types affecting a UE. Therefore, aspects presented herein provide UE assisted interference learning, in which the UE detects an interfering signal and reports information such as the interference level and properties of the interfering signal to a serving eNB.

In an aspect of the disclosure, a method, a computer program product, and an apparatus are provided. The apparatus may be a UE. The apparatus detects at least one interfering signal. In addition, the apparatus determines properties of the at least one interfering signal. The properties include at least a type of wireless technology. The apparatus transmits information indicating the properties of each of the at least one interfering signal to a serving eNB.

In another aspect, a method, a computer program product, and an apparatus are provided. The apparatus may be an eNB. The apparatus receives, from a UE, information indicating properties of each of at least one interfering signal of the UE. The properties include at least a type of wireless technology. The apparatus sends information to the UE based, at least in part, on the received information indicating the properties of each of the at least one interfering signal.

DETAILED DESCRIPTION

Figure 1:
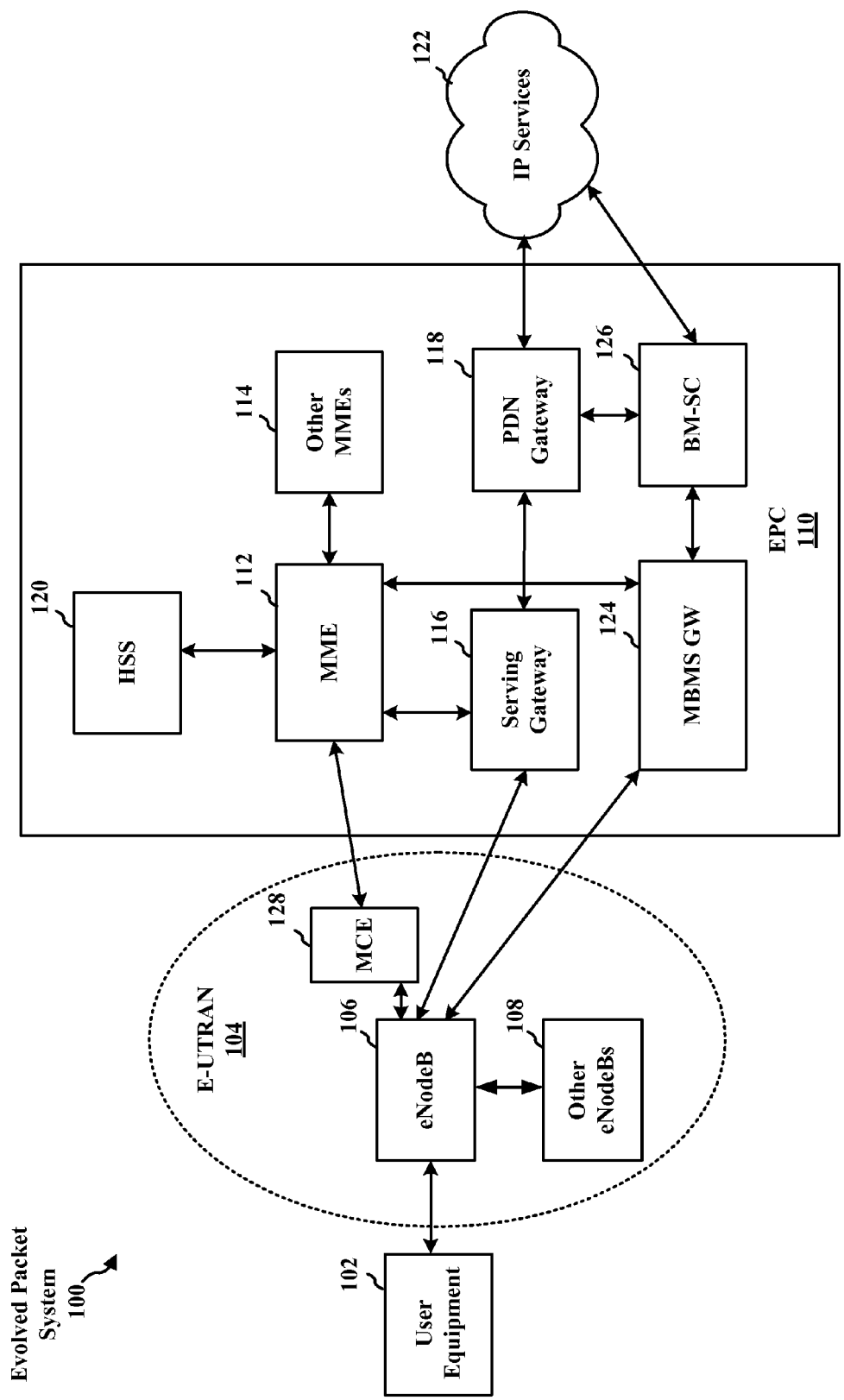
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
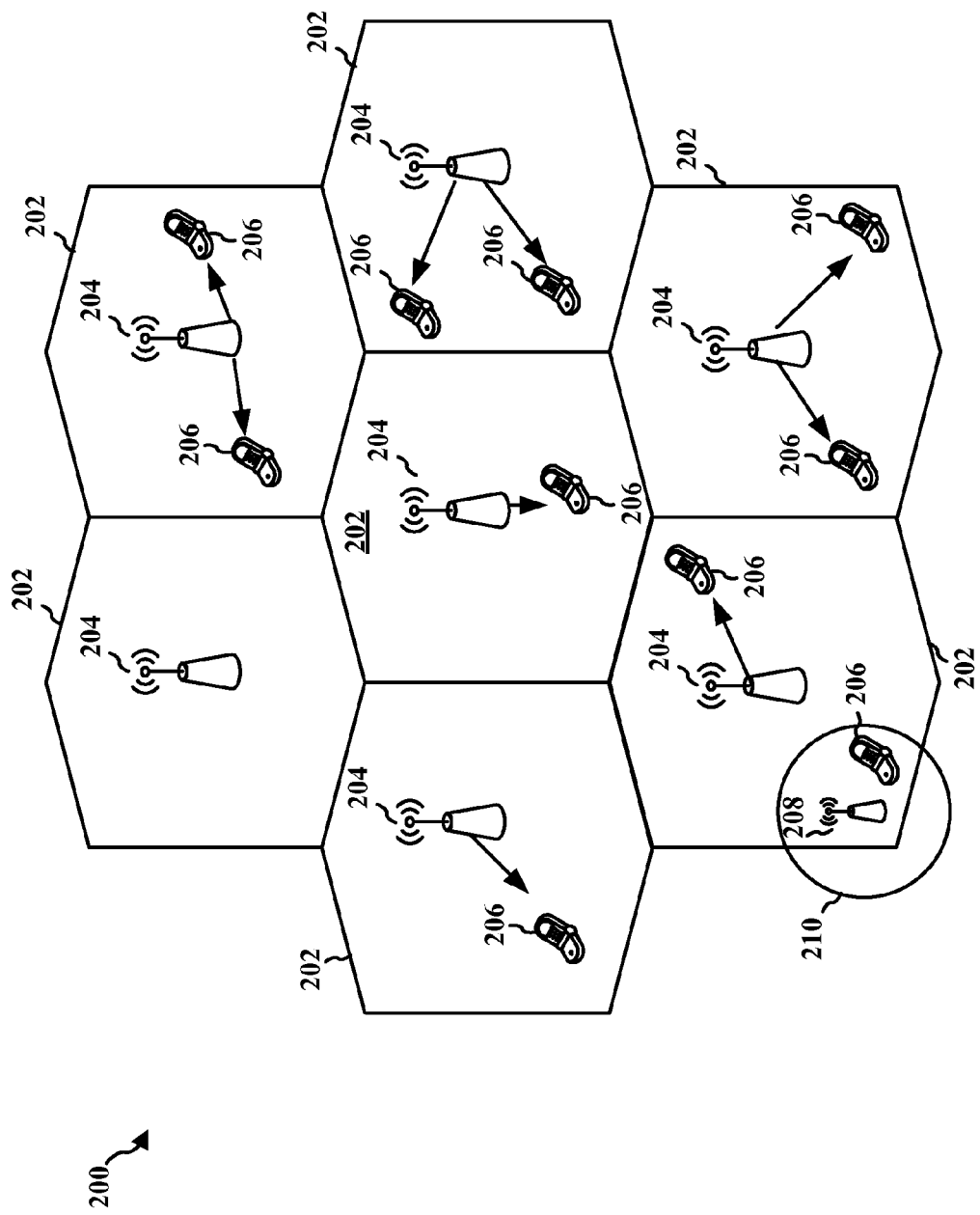
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

DL and UL data in LTE may be organized as resource blocks. A resource block has dimensions of subcarriers by symbols. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section. A UE may be assigned resource blocks in the control section to transmit control information to an eNB. The UE may also be assigned resource blocks in the data section to transmit data to the eNB.

The radio protocol architecture for the UE and the eNB may include three layers: Layer 1, Layer 2, and Layer 3. Layer 1 (L1 layer) is the lowest layer and implements various physical layer signal processing functions. The L1 layer may be referred to as the physical layer. Layer 2 (L2 layer) is above the physical layer and is responsible for the link between the UE and eNB over the physical layer.

In the user plane, the L2 layer includes a media access control (MAC) sublayer, a radio link control (RLC) sublayer, and a packet data convergence protocol (PDCP) 514 sublayer, which are terminated at the eNB on the network side. The UE may have several upper layers above the L2 layer including a network layer (e.g., IP layer) that is terminated at the PDN gateway 118 on the network side, and an application layer that is terminated at the other end of the connection (e.g., far end UE, server, etc.).

In the control plane, the radio protocol architecture for the UE and eNB is substantially the same for the physical layer and the L2 layer with the exception that there is no header compression function for the control plane. The control plane also includes a radio resource control (RRC) sublayer in Layer 3 (L3 layer). The RRC sublayer 516 is responsible for obtaining radio resources (e.g., radio bearers) and for configuring the lower layers using RRC signaling between the eNB and the UE.

Figure 3:
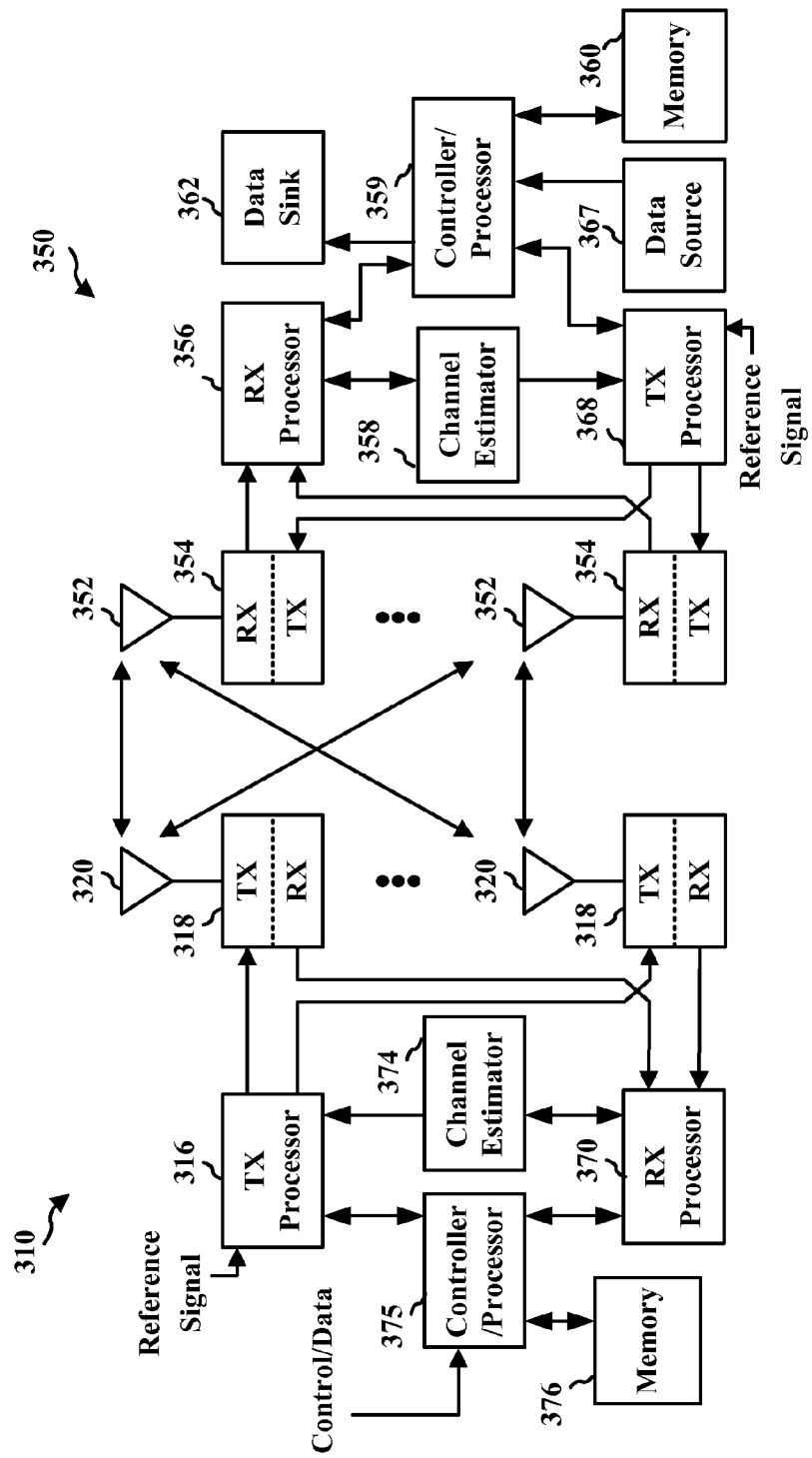
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
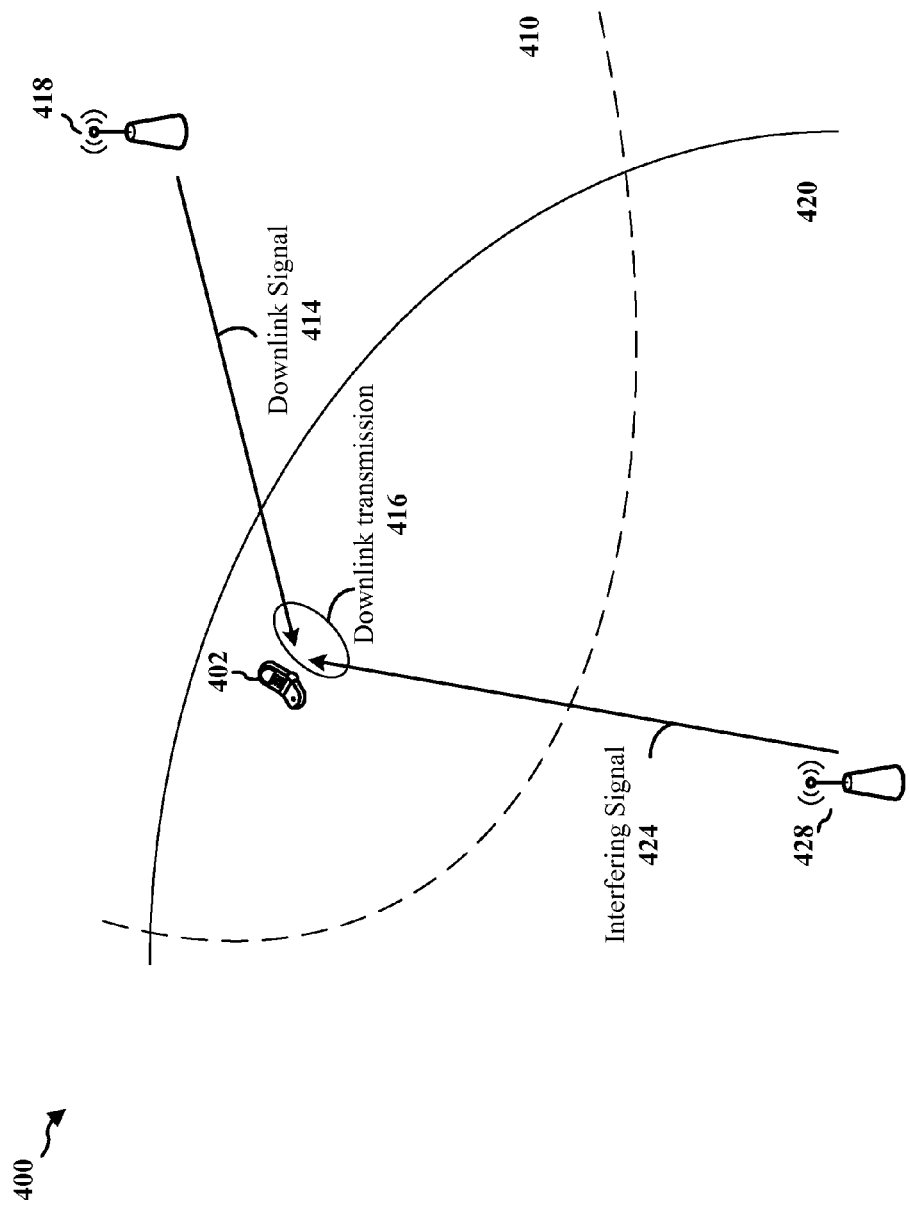
FIG. 4 is a diagram of a UE receiving a downlink signal and an interfering signal.

FIG. 4 is a diagram 400 of a UE 402 receiving a downlink signal 414 and an interfering signal 424. In some examples, the UE 402 may receive the downlink transmission 416 which includes the downlink signal 414 and the interfering signal 424. The UE 402 receives the downlink signal 414 from the serving eNB 418 of the cell 410. In one example, the serving cell 410 may be a part of an LTE-Unlicensed (e.g., LTE licensed-assisted access for unlicensed spectrum, LTE stand-alone on unlicensed spectrum, etc.) communication system (e.g., an LTE system deployed using unlicensed spectrum). The UE 402 receives the interfering signal 424 from a base station (BS)/access point (AP) 428 of the cell 420. The BS/AP 428 may be associated with a particular wireless technology. For example, the BS/AP 428 may be an eNB associated with LTE or an AP associated with Wi-Fi 802.11n, 802.11ac, or 802.11ax.

In certain deployments of an LTE system, the network may not be aware of the interference experienced at a UE. For example, in deployment using unlicensed wireless spectrum, there may be uncoordinated transmissions of heterogeneous types of wireless technologies impacting the UE. In a first example, the signals 414, 424 may be LTE-Unlicensed transmissions from the same PLMN. Such transmissions may be synchronous in time/frequency, and have a time granularity of one subframe. In a second example, the signals 414, 424 may be LTE-Unlicensed transmissions from a different PLMN (which may be completely uncoordinated). Such transmissions may be asynchronous is time/frequency, and have a time granularity of one subframe. In a third example, the signals 414, 424 may be different Wi-Fi transmissions. Such transmissions may be bursty in time. Examples of wireless technologies associated with Wi-Fi include Wi-Fi 802.11 (20 MHz and 40 MHz), Wi-Fi 802.11ac (20 MHz, 40 MHz, 80 MHz, and 160 MHz), and Wi-Fi 802.11ax (2.5 or 5 MHz granularity). In such scenarios, the eNB 418 may not be able to take the interfering signal 424 into account for scheduling the downlink signal 414 or for other measures of interference mitigation.

Figure 5:
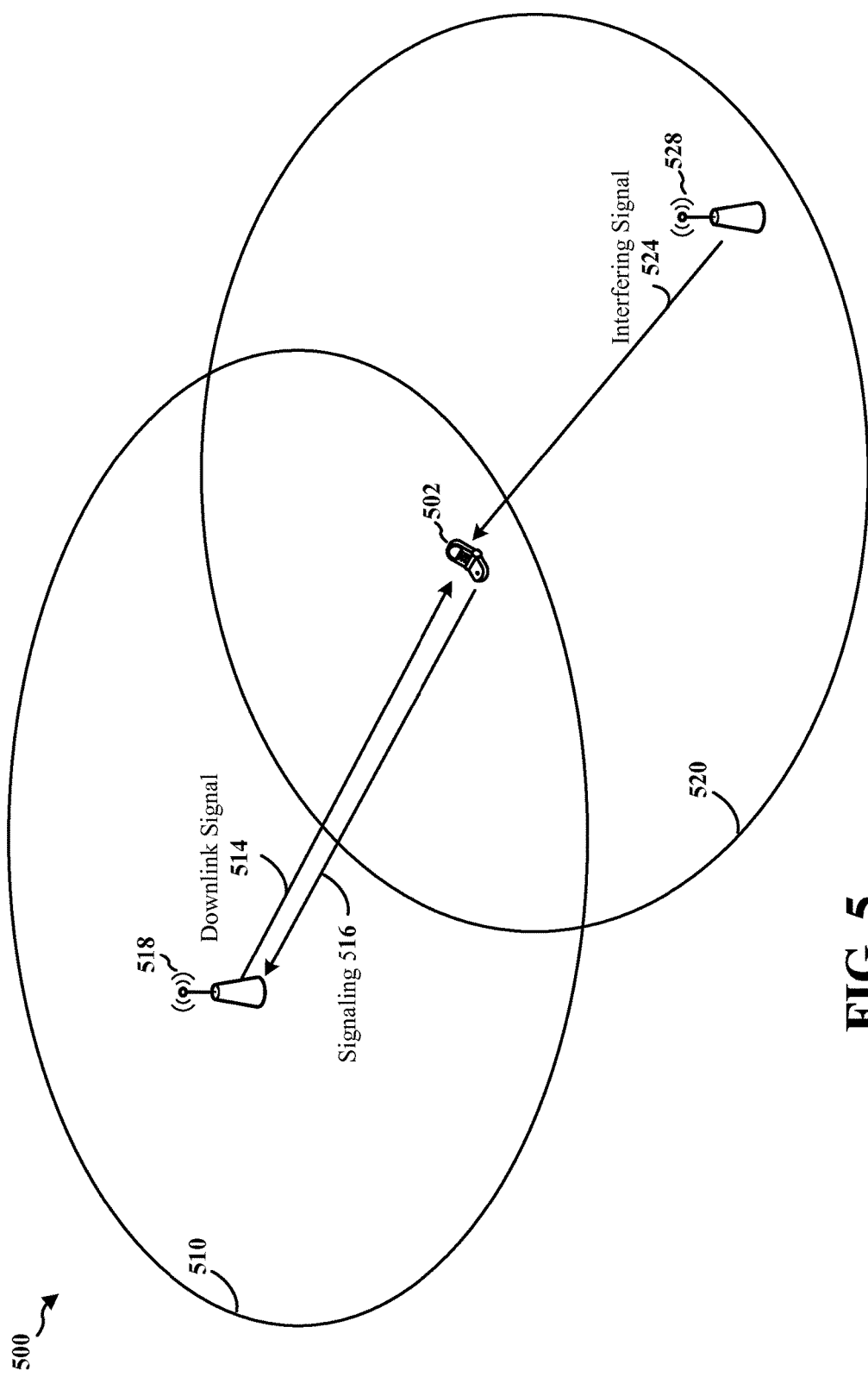
FIG. 5 is a first diagram for illustrating exemplary methods/apparatuses configured for UE assisted interference learning.

FIG. 5 is a first diagram 500 for illustrating exemplary methods/apparatuses configured for UE assisted interference learning. The UE 502 is within the serving cell 510 and receives a downlink signal 514 from the serving eNB 518. Moreover, the UE 502 receives the interfering signal 524 from a BS/AP 528, which is within the UE 502 reception radius 520. The downlink signal 514 and the interfering signal 524 are received concurrently in time. The BS/AP 528 may be an LTE eNB associated with a different PLMN, may be a Wi-Fi AP, or otherwise, may be a BS/AP that is uncoordinated with the eNB 518 such that the eNB 518 is unaware of the interfering signal 524.

In exemplary configurations, in order to provide the eNB 518 knowledge of the interfering signal 524, the UE 502 may detect, estimate, measure, and/or classify the interference from the BS/AP 528. In some examples, the UE 502 may detect the interfering signal 524 based on, e.g., detected type and/or estimated interference. The UE 502 may further determine properties of the interfering signal 524, such as interference levels, properties of the interference, and/or the type of interference (e.g., a type of wireless technology). In some examples, the UE 502 may determine the properties by estimating from the detected interferences, matching the detected interferences with known patterns of interferences, or any other method that may be relevant. In one example, the UE 502 may detect a Wi-Fi preamble in the interfering signal 524, and may classify the BS/AP 528 as a Wi-Fi interferer associated with one of the Wi-Fi wireless technologies (e.g., 802.11a, 802.11n, 802.11ac, 802.11ax, etc.). In another example, the UE 502 may detect that the interfering signal 524 is bursty in time (e.g., lasting 100 us-200 us rather than 1 ms), and may classify the interfering signal 524 as Wi-Fi (based on its bursty nature). In yet another example, the UE 502 may determine a bandwidth of the interference, and may classify the Wi-Fi interference based on the determined bandwidth (e.g., as one of the Wi-Fi wireless technologies 802.11a, 802.11n, 802.11ac, or 802.11ax based on the determined bandwidth). In yet another example, the UE 502 may determine that the interfering signal 524 is an LTE-Unlicensed interferer from a different PLMN based on the PLMN ID, the asynchronous LTE-Unlicensed waveform, and/or because the interference lasts for periods of 1 ms. In the aforementioned examples, the UE 502 may use LTE, Wi-Fi, and/or other types of receivers to estimate the interference associated with various wireless technologies. For example, the UE 502 may use a Wi-Fi receiver when determining or estimating the interference based on a detected Wi-Fi preamble. In another example, the UE 502 may use an LTE receiver when determining or estimating the interference based on the burstiness or the bandwidth of the interference.

The UE 502 may report the determined properties of the interfering signal 524 (e.g., interference levels, properties of the interference, and/or the type of interference such as the type of wireless technology) to the serving eNB 518 (e.g., via signaling 516). The UE 502 may report the number of interferers to the serving eNB 518. The UE 502 may report a strength of the interference, a periodicity (temporal frequency) of the interference, and/or other properties of the interference.

The UE 502 and/or the eNB 518 may use the determined information to improve communication performance. For example, the eNB 518 may improve scheduling and/or interference measurement configurations based on the received information. For another example, the UE 502 may improve interference estimation/mitigation/cancellation and/or demodulation/decoding performance based on the determined information.

Moreover, the eNB 518 may utilize the information receive from the UE 502, such as the type of interference and/or the type of wireless technology, to adjust the window contention (e.g., a time period before retrying for communication). For example, within a communication system operating in the unlicensed band under Listen-before-Talk rules, a node (e.g., an eNB) attempting to transmit needs to sense the medium (e.g., transmission spectrum) and determine whether the medium is free to use. If the medium is not free, then the node re-attempts channel sensing after a certain time window, or the contention window, before contending again. This time duration of this window may be adjusted static, semi-static or dynamically adjusted.

In some examples, the eNB 518 may optimize the contention window either semi-statically or dynamically based on the feedback transmitted by the UE 502 (e.g., the type of interference and/or the type of wireless technology of the interfering signal 524). This optimization may be pertinent to the type of collision observed and reported by the UE 502. For example, the contention window may be adjusted a certain way if a Wi-Fi interference is reported, and may be adjusted a different way if another LTE-U interferer is reported to optimized performance. By example, if Wi-Fi interference is detected, the contention window may be increased to avoid excessive interference to the Wi-Fi network. Conversely, if LTE-U interference is detected the contention window may remain the same (or be minimally adjusted) to allow the opportunity of more efficient usage of the medium among LTE-U users. In both scenarios, the adjustment to the contention window may be determined as a function of interference strength, relative strength between desired signal and interference, duration of interference to the desired transmission, or bandwidth of interference to the desired transmission. In some examples, the UE feedback is incorporated into channel sensing process as well for the determination of contention window length.

Figure 6:
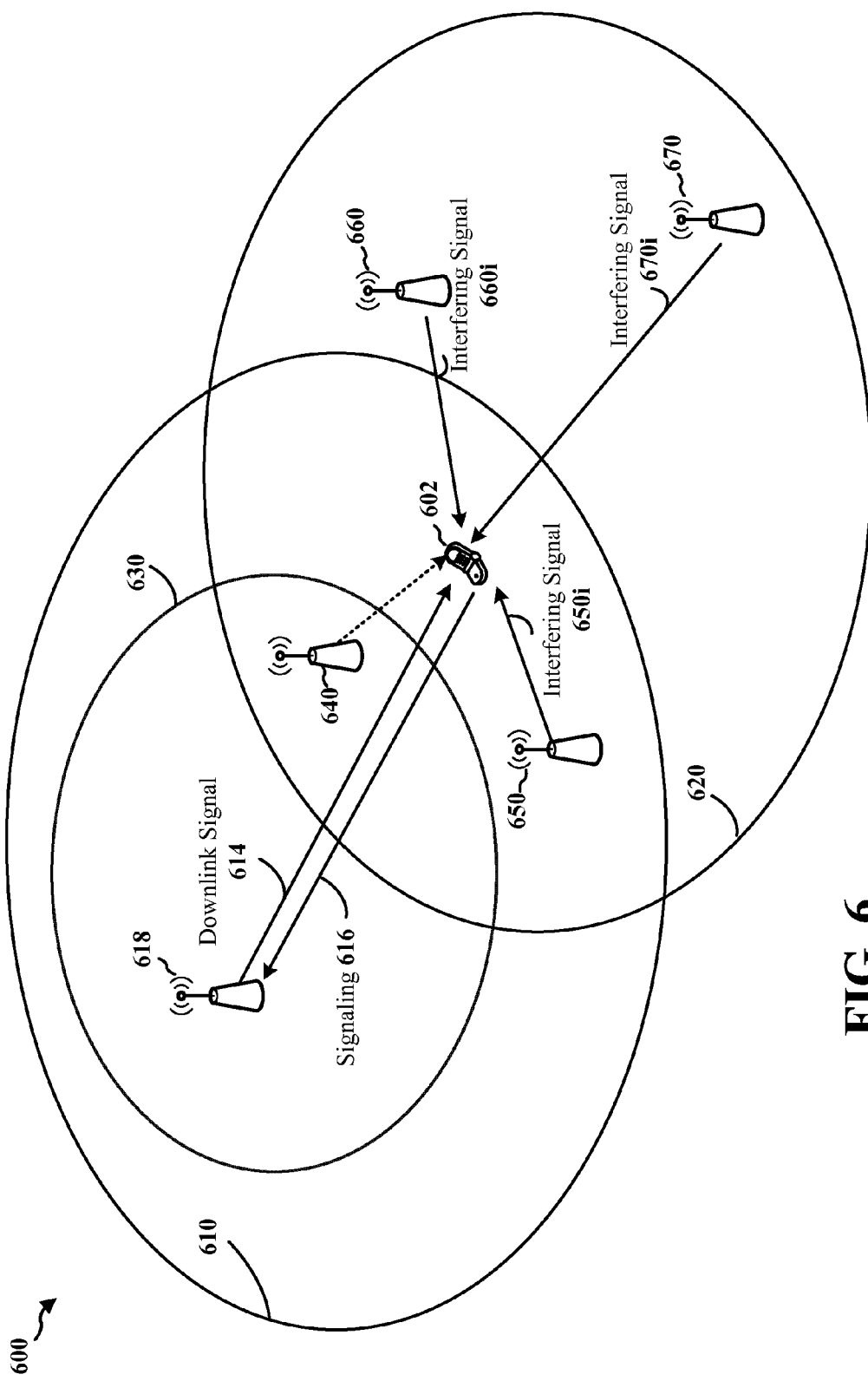
FIG. 6 is a second diagram for illustrating exemplary methods/apparatuses configured for UE assisted interference learning.

FIG. 6 is a second diagram 600 for illustrating exemplary methods/apparatuses configured for UE assisted interference learning. In some examples, the BSs/APs 640, 650, 660, and 670 may be Wi-Fi APs and/or LTE-Unlicensed eNB interferers within the UE 602 reception radius 620. An example is presented in a case that the BSs/APs 640, 650, 660 are Wi-Fi APs, and the BS/AP 670 is an LTE-Unlicensed eNB interferer. The AP 650 may be an 802.11n Wi-Fi system. The UE 602 may receive interfering signal 650*i* from the AP 650. The interfering signal 650*i* may have a bandwidth of 20 MHz or 40 MHz and may be in accordance with the 802.11n Wi-Fi specification. The AP 660 may be an 802.11ac Wi-Fi system. The UE 602 may receive interfering signal 660*i* from the AP 660. The interfering signal 660*i* may have a bandwidth of 20/40/80/160 MHz (depending on the deployment) and may be in accordance with the 802.11ac Wi-Fi specification. The AP 640 may be an 802.11ax Wi-Fi system (with bandwidth granularity of 5 MHz). As the AP 640 is within a clear channel assessment (CCA) zone 630, the AP 640 and the eNB 618 may coordinate together such that the UE 602 does not receive interference from the AP 640.

In this example, the eNB 618 of the serving cell 610 has no knowledge of the various interfering signals (e.g., 650*i*, 660*i*, 670*i*). The UE 602 may detect, estimate, measure, and/or classify each of the interfering signals 650*i*, 660*i*, 670*i* based on detected interference. Alternatively or in addition, the UE 602 may determine properties of the interfering signals 650*i*, 660*i*, 670*i*. In some examples, the UE 602 may determine the properties by estimating from the detected interferences, matching the detected interferences with known patterns of interferences, or any other method that may be relevant. The determined properties may include the types of the wireless technologies, such as Wi-Fi 802.11a, Wi-Fi 802.11n, Wi-Fi 802.11ac, Wi-Fi 802.11ax, LTE, etc. Moreover, properties may further include information regarding a deployment of the type of wireless technology. For example, for an interfering signal in accordance with Wi-Fi 802.11n, the determined properties may include indications of whether the interfering signal has a bandwidth of 20 MHz or 40 MHz.

The UE 602 may report the information indicating the properties of the interfering signals 650*i*, 660*i*, 670*i* (e.g., a type of wireless technology, interference levels, properties of the interference, and/or the type of interference) to the serving eNB 618 (e.g., via uplink signaling 616) for improved interference mitigation measures. In some examples, the UE 602 and/or the eNB 618 may utilize the determined properties of the interfering signals or the information indicating the properties of the interfering signal(s) to improve interference mitigation/cancellation. In one example, the eNB 618 may, based on the reported information indicating the properties of the interfering signals, adjust a downlink assignment to the UE 602 to improve mitigation/cancellation of the interfering signals. For example, the eNB 618 may change frequency resources scheduled for the downlink signal 614 to avoid a bandwidth of an interfering signal. In another example, the eNB 618 may change (e.g., lower) an MCS for the downlink signal 614 for better demodulation/decoding performance in the presence of the interfering signal. The eNB 618 may transmit a downlink assignment to the UE 602 for the downlink signal 614. The downlink assignment may include scheduling and an MCS, one or more of which may be determined by the eNB 618 based on the received properties. The UE 602 receives the downlink assignment for the downlink signal 614 from the serving eNB 618 and receives the downlink signal 614 accordingly (e.g., based on the scheduled frequency resources and/or the MCS).

In one example, the eNB 618 may, based on the reported information indicating the properties of the interfering signals, determine a configuration for measuring interference. For example, for an LTE interfering signal, the interference measurement may be configured for each subframe based on the periodicity of the LTE interfering signal. For a Wi-Fi interfering signal, the interference measurement may be performed more often due to the burst transmissions of the Wi-Fi. The eNB 618 may, for example, configure the interference measurement for each symbol. In one example, the eNB 618 may provide the configuration for measuring interference to the UE 602 via an RRC signaling message. The interference measurement configuration may indicate interference measurement resources (IMRs) and may indicate zero-power channel state information reference signals (ZP-CSI-RS) for performing the interference measurement.

In one example, the UE 602 may process the received downlink signal 614 from the serving eNB 618 and process the downlink signal 614 based on the determined properties of the interfering signals. The processing of the downlink signal 614 may include decoding/demodulating the downlink signal 614. In one example, the UE 602 may mitigate (e.g., subtract, reduce, cancel) the interference based on the determined properties of the interfering signals before demodulating and decoding the downlink signal 614.

Figure 7:
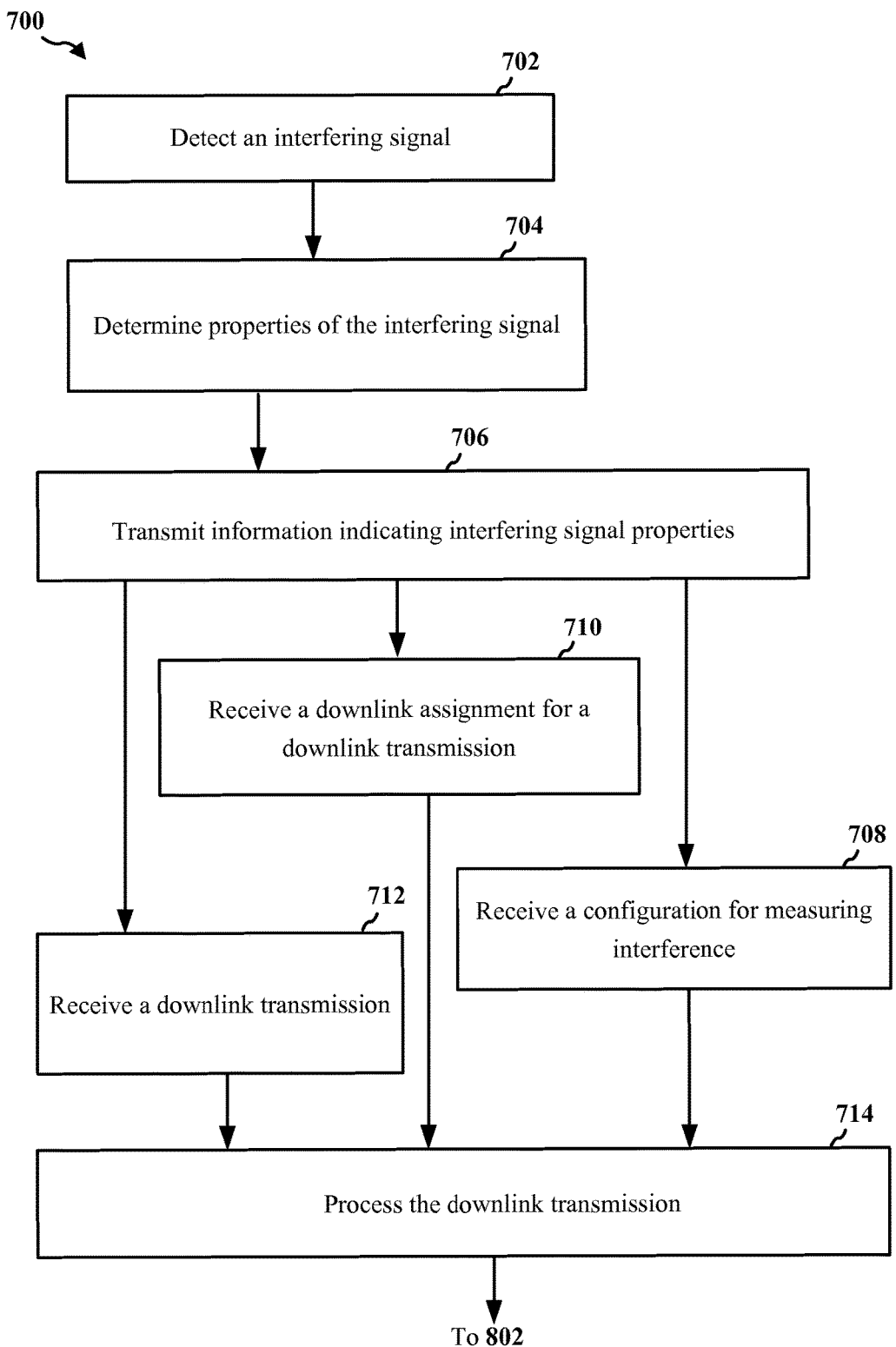
FIG. 7 is a flow chart of a method of wireless communication.
Figure 8:
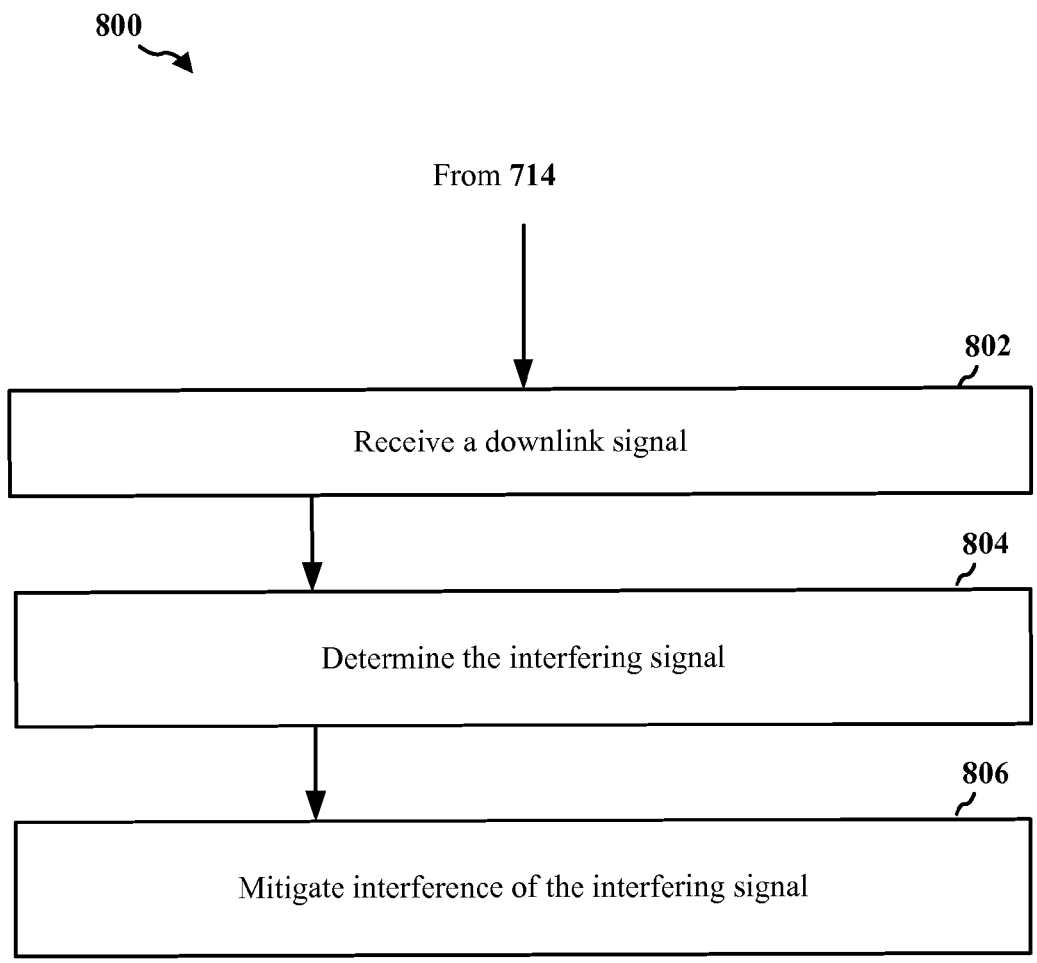
FIG. 8 is another portion of the flow chart of a method of wireless communication.

FIG. 7 is a flow chart 700 of a method of wireless communication. FIG. 8 is another portion of the flow chart 700. The method may be performed by a UE (e.g., UE 402, 502, 602, etc.).

At 702, an interfering signal may be detected. Referring to FIG. 5, the UE 502 may detect, estimate, measure, and/or classify the interference (e.g., the interfering signal) over time from the BS/AP 528. In some examples, the UE 502 may detect the interfering signal 524 based on interference detected and/or estimated. The UE 502 may determine one or more of interference levels, properties of the interference, and/or the type of interference. Referring to FIG. 6, for example, the eNB 618 of the serving cell 610 has no knowledge of the various interfering signals (e.g., 650*i*, 660*i*, 670*i*). The UE 602 may detect, estimate, measure, and/or classify each of the interfering signals 650*i*, 660*i*, 670*i* based on interference that is detected and/or estimated.

At 704, properties of the interfering signal may be determined. For example, the properties may include at least a type of wireless technology. Referring to FIG. 5, the UE 502 may determine properties of the interfering signal 524, such as interference levels, properties of the interference, and/or the type of interference (e.g., a type of wireless technology). In some examples, the UE 502 may determine the properties by estimating from the detected interferences, matching the detected interferences with known patterns of interferences, or any other method that may be relevant. For example, the UE 502 may detect a Wi-Fi preamble in the interfering signal 524, and may classify the BS/AP 528 as a Wi-Fi interferer associated with one of the Wi-Fi wireless technologies (e.g., 802.11a, 802.11n, 802.11ac, 802.11ax, etc.). The UE 502 may detect that the interfering signal 524 is bursty in time (e.g., lasting 100 us-200 us rather than 1 ms), and may classify the interfering signal 524 as Wi-Fi based on its bursty nature. In yet another example, the UE 502 may determine a bandwidth of the interference, and may classify the Wi-Fi interference based on the determined bandwidth (e.g., as one of the Wi-Fi wireless technologies 802.11a, 802.11n, 802.11ac, or 802.11ax based on the determined bandwidth). In yet another example, the UE 502 may determine that the interfering signal 524 is an LTE-Unlicensed interferer from a different PLMN based on the PLMN ID, the asynchronous LTE-Unlicensed waveform, and/or because the interference lasts for periods of 1 ms.

Referring to FIG. 6, for example, the UE 602 may determine properties of the interfering signals 650*i*, 660*i*, 670*i*. In some examples, the UE 602 may determine the properties by estimating from the detected interferences, matching the detected interferences with known patterns of interferences, or any other method that may be relevant. The determined properties may include the types of the wireless technologies, such as Wi-Fi 802.11a, Wi-Fi 802.11n, Wi-Fi 802.11ac, Wi-Fi 802.11ax, LTE, etc. Moreover, properties may further include information regarding a deployment of the type of wireless technology. For example, for an interfering signal in accordance with Wi-Fi 802.11n, the estimated properties may include indications of whether the interfering signal has a bandwidth of 20 MHz or 40 MHz.

At 706, information indicating the interfering signal properties is transmitted. For example, the properties of the interfering signal may be transmitted to a serving eNB. The transmitted information may, for example, indicate at least one of a strength of each of the at least one interfering signal, a periodicity of each of the at least one interfering signal, a bandwidth of each of the at least one interfering signal, or a frequency of each of the at least one interfering signal.

Referring to FIG. 5, for example, the UE 502 may report the determined properties of the interfering signal 524 (e.g., interference levels, properties of the interference, and/or the type of interference such a type of wireless technology) to the serving eNB 518 (e.g., via signaling 516). The UE 502 may report the number of interferers to the serving eNB 518. The UE 502 may report a strength of the interference, a periodicity (temporal frequency) of the interference, and/or other properties of the interference.

Referring to FIG. 6, for example, the UE 602 may report the information indicating the properties of the interfering signals 650$i$, 660$i$, 670$i$ (e.g., interference levels, properties of the interference, and/or the type of interference such as a type of wireless technology) to the serving eNB 618 (e.g., via signaling 616) for improved interference mitigation measures.

At 708, a configuration for measuring interference may be received. The configuration may be based on the transmitted information (e.g., of step 706) and received by the UE. In some examples, the configuration may be received in a radio resource control (RRC) message indicating interference measurement resources. In some examples, the configuration may be received in an RRC message indicating interference measurement resources.

In one example, the eNB 618 may, based on the reported information indicating the properties of the interfering signals, determine a configuration for measuring interference. For example, for an LTE interfering signal, the interference measurement may be configured for each subframe based on the periodicity of the LTE interfering signal. For a Wi-Fi interfering signal, the interference measurement may be performed more often due to the burst transmissions of the Wi-Fi. The eNB 618 may, for example, configure the interference measurement for each symbol. In one example, the eNB 618 may provide the configuration for measuring interference to the UE 602 via an RRC signaling message. The interference measurement configuration may indicate interference measurement resources (IMRs) and may indicate zero-power channel state information reference signals (ZP-CSI-RS) for performing the interference measurement.

At 710, a downlink assignment for a downlink transmission may be received, e.g., from the serving eNB. The downlink assignment may be based on the transmitted information (e.g., of step 706). Referring to FIG. 6, for example, the UE 602 and/or the eNB 618 may utilize the determined properties of the interfering signals or the information indicating the properties of the interfering signal(s) to improve interference mitigation/cancellation. In one example, the eNB 618 may, based on the reported information indicating the properties of the interfering signals, adjust a downlink assignment to the UE 602 to improve mitigation/cancellation of the interfering signals. For example, the eNB 618 may change frequency resources scheduled for the downlink signal 614 to avoid a bandwidth of an interfering signal. In another example, the eNB 618 may change (e.g., lower) an MCS for the downlink signal 614 for better demodulation/decoding performance in the presence of the interfering signal. The eNB 618 may transmit a downlink assignment to the UE 602 for the downlink signal 614. The downlink assignment may include scheduling and an MCS, one or more of which may be determined by the eNB 618 based on the received properties.

At 712, a downlink transmission may be received, e.g., from the serving eNB. Referring to FIG. 5, for example, the UE 502 may receive the downlink transmission via the downlink signal 614. Referring to FIG. 6, for example, the UE 602 may receive the downlink transmission via the downlink signal 614.

At 714, the downlink transmission may be processed, e.g., based on the determined properties of the interfering signal. Referring to FIG. 5, for example, the UE 502 and/or the eNB 518 may use the determined information to improve communication performance. For example, the eNB 518 may improve scheduling and/or interference measurement configurations based on the received information. For another example, the UE 502 may improve interference estimation/mitigation/cancellation and/or demodulation/decoding performance based on the determined information.

Referring to FIG. 6, for example, the eNB 618 may transmit a downlink assignment to the UE 602 for the downlink signal 614. The downlink assignment may include scheduling and an MCS, one or more of which may be determined by the eNB 618 based on the received properties. The UE 602 receives the downlink assignment for the downlink signal 614 from the serving eNB 618 and receives the downlink signal 614 accordingly (e.g., based on the scheduled frequency resources and/or the MCS). In one example, the UE 602 may process the received downlink signal 614 from the serving eNB 618 and process the downlink signal 614 based on the estimated properties of the interfering signals. The processing of the downlink signal 614 may include decoding/demodulating the downlink signal 614. In one example, the UE 602 may mitigate (e.g., subtract, reduce, cancel) the interference based on the estimated properties of the interfering signals before demodulating and decoding the downlink signal 614.

At 802, a downlink signal may be received, e.g., by the UE. The downlink signal may include a downlink transmission from the serving eNB and the at least one interfering signal. Referring to FIG. 6, for example, the UE 602 receives a downlink signal that includes downlink signal 614 (e.g., downlink transmission) from the serving eNB 618. The downlink signal may further include interfering signals 650$i$, 660$i$, and/or 670$i$.

At 804, the interfering signal may be determined, e.g., based on the determined properties of the interfering signal. Referring to FIG. 5, for example, the UE 502 may detect a Wi-Fi preamble in the interfering signal 524, and may classify the BS/AP 528 as a Wi-Fi interferer associated with one of the Wi-Fi wireless technologies (e.g., 802.11a, 802.11n, 802.11ac, 802.11ax, etc.). In another example, the UE 502 may detect that the interfering signal 524 is bursty in time (e.g., lasting 100 us-200 us rather than 1 ms), and may classify the interfering signal 524 as Wi-Fi based on its bursty nature. In yet another example, the UE 502 may determine a bandwidth of the interference, and may classify the Wi-Fi interference based on the determined bandwidth (e.g., as one of the Wi-Fi wireless technologies 802.11a, 802.11n, 802.11ac, or 802.11ax based on the determined bandwidth). In yet another example, the UE 502 may determine that the interfering signal 524 is an LTE-Unlicensed interferer from a different PLMN based on the PLMN ID, the asynchronous LTE-Unlicensed waveform, and/or because the interference lasts for periods of 1 ms.

Referring to FIG. 6, for example, the UE 602 may detect, estimate, measure, and/or classify each of the interfering signals 650$i$, 660$i$, 670$i$. Alternatively or in addition, the UE 602 may determine properties of the interfering signals 650$i$, 660$i$, 670$i$. In some examples, the UE 602 may determine the properties by estimating from the detected interferences, matching the detected interferences with known patterns of interferences, or any other method that may be relevant. The determined properties may include the types of the wireless technologies, such as Wi-Fi 802.11a, Wi-Fi 802.11n, Wi-Fi 802.11ac, Wi-Fi 802.11ax, LTE, etc. Moreover, properties may further include information regarding a deployment of the type of wireless technology. For example, for an interfering signal in accordance with Wi-Fi 802.11n, the estimated properties may include indications of whether the interfering signal has a bandwidth of 20 MHz or 40 MHz.

At 806, interference of the interfering signal may be mitigated, e.g., from the downlink transmission based on the determined interfering signal (which may be based on based on the determined properties of the interfering signal). Referring to FIG. 5, for example, the UE 502 and/or the eNB 518 may use the determined information to improve communication performance. For example, the eNB 518 may improve scheduling and/or interference measurement configurations based on the received information. For another example, the UE 502 may improve interference estimation/mitigation/cancellation and/or demodulation/decoding performance based on the determined information.

Referring to FIG. 6, for example, the UE 602 and/or the eNB 618 may utilize the determined properties of the interfering signals or the information indicating the properties of the interfering signal(s) to improve interference mitigation/cancellation. In one example, the eNB 618 may, based on the reported information indicating the properties of the interfering signals, adjust a downlink assignment to the UE 602 to improve mitigation/cancellation of the interfering signals. For example, the eNB 618 may change frequency resources scheduled for the downlink signal 614 to avoid a bandwidth of an interfering signal. In another example, the eNB 618 may change (e.g., lower) an MCS for the downlink signal 614 for better demodulation/decoding performance in the presence of the interfering signal. The eNB 618 may transmit a downlink assignment to the UE 602 for the downlink signal 614. The downlink assignment may include scheduling and an MCS, one or more of which may be determined by the eNB 618 based on the received properties. The UE 602 receives the downlink assignment for the downlink signal 614 from the serving eNB 618 and receives the downlink signal 614 accordingly (e.g., based on the scheduled frequency resources and/or the MCS).

In one example, the eNB 618 may, based on the reported information indicating the properties of the interfering signals, determine a configuration for measuring interference. For example, for an LTE interfering signal, the interference measurement may be configured for each subframe based on the periodicity of the LTE interfering signal. For a Wi-Fi interfering signal, the interference measurement may be performed more often due to the burst transmissions of the Wi-Fi. The eNB 618 may, for example, configure the interference measurement for each symbol. In one example, the eNB 618 may provide the configuration for measuring interference to the UE 602 via an RRC signaling message. The interference measurement configuration may indicate interference measurement resources (IMRs) and may indicate zero-power channel state information reference signals (ZP-CSI-RS) for performing the interference measurement.

In one example, the UE 602 may process the received downlink signal 614 from the serving eNB 618 and process the downlink signal 614 based on the estimated properties of the interfering signals. The processing of the downlink signal 614 may include decoding/demodulating the downlink signal 614. In one example, the UE 602 may mitigate (e.g., subtract, reduce, cancel) the interference based on the estimated properties of the interfering signals before demodulating and decoding the downlink signal 614.

Figure 9:
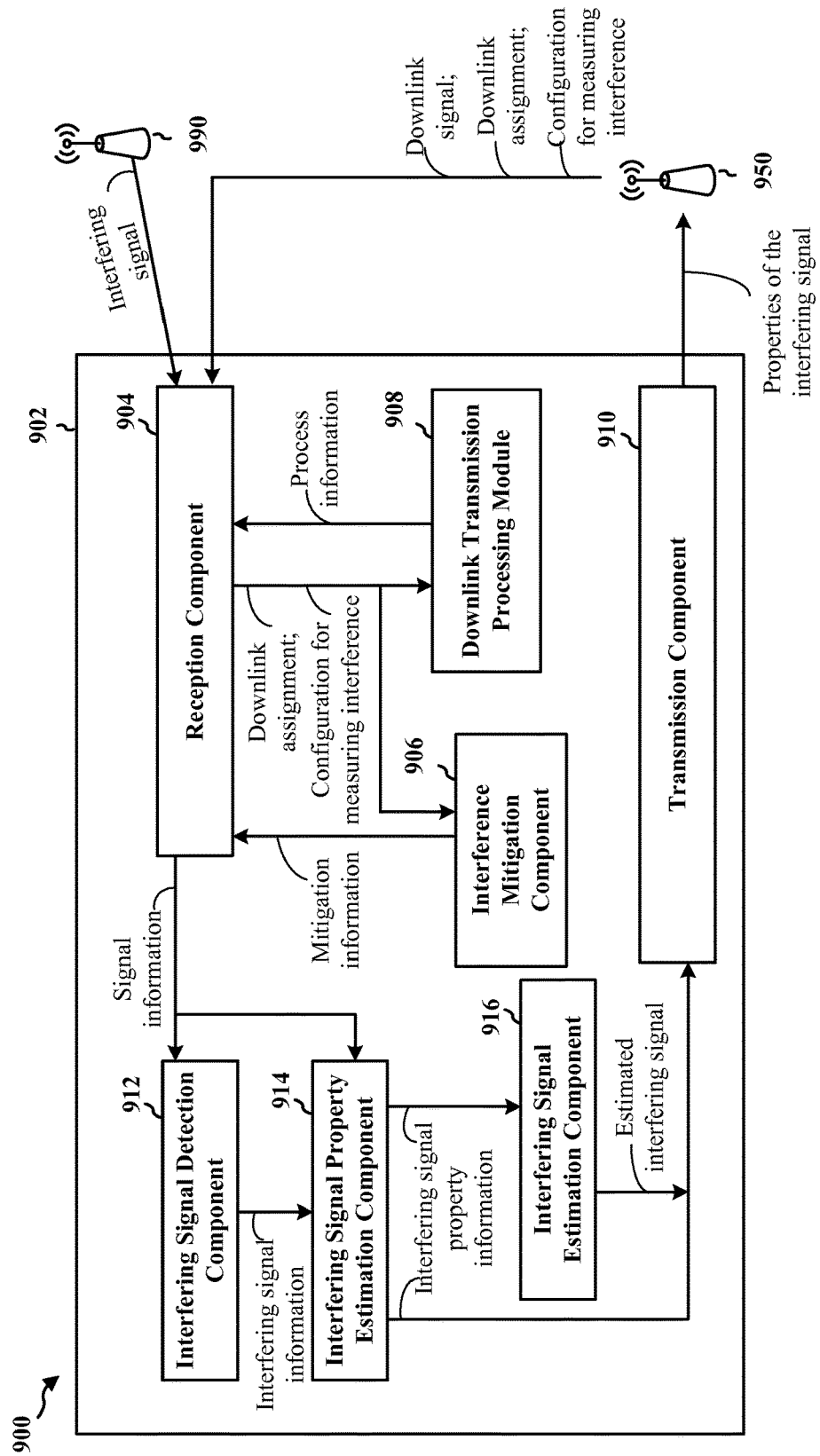
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., UE 402, 502, or 602). The apparatus 902 includes a reception component 904, an interfering mitigation component 906, a transmission component 910, an interfering signal detection component 912, an interfering signal property estimation component 914, and an interfering signal estimation component 916.

The reception component 904 receives a downlink signal from a serving eNB 950 and an interfering signal from a BS/AP 990 and outputs signal information. The reception component 904 may in addition receive the downlink assignment or the configuration for measuring interference.

The interfering signal detection component 912 detects the interfering signal based on signal information from the reception component 904. The interfering signal detection component 912 may output the interfering signal information to the interfering signal property estimation component 914.

The interfering signal property estimation component 914 estimates the properties of the interfering signal based on the interfering signal information from the interfering signal detection component 912 and/or the signal information from the reception component 904. Based on the received information, the interfering signal property estimation component 914 may output the interfering signal information.

The interfering signal estimation component 916 estimates the interfering signal based on the interfering signal information. For example, the interfering signal estimation component 916 may estimate the interfering signal as an LTE-Unlicensed signal or the Wi-Fi signal of various deployments. The interfering signal estimation component 916 may output the estimated interfering signal to the downlink transmission processing component 908.

The interfering mitigation component 906 receives the downlink assignment or the configuration for measuring interference from the reception component 904. Based on the received information, the interfering mitigation component 906 provides to the reception component 904 mitigation information to mitigate the interfering signal.

The downlink transmission processing component 908 receives the downlink assignment or the configuration for measuring interference from the reception component 904. Based on the received information, the downlink transmission processing component 908 provides to the reception component 904 processing information to process the downlink signal.

The transmission component 910 may receive the properties of the interfering signal (e.g., the estimated interfering signal from the interfering signal estimation component 916 or the interfering signal property information from the interfering signal property estimation component 914). The transmission component 910 may output the received properties of the interfering signal to the eNB 950. Based on the properties of the interfering signal, the eNB 950 may output the downlink assignment or the configuration for measuring interference to the reception component 904.

The apparatus may include additional components that perform each of the blocks of the algorithm in the aforementioned flow charts of FIGS. 7 and 8. As such, each block in the aforementioned flow charts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
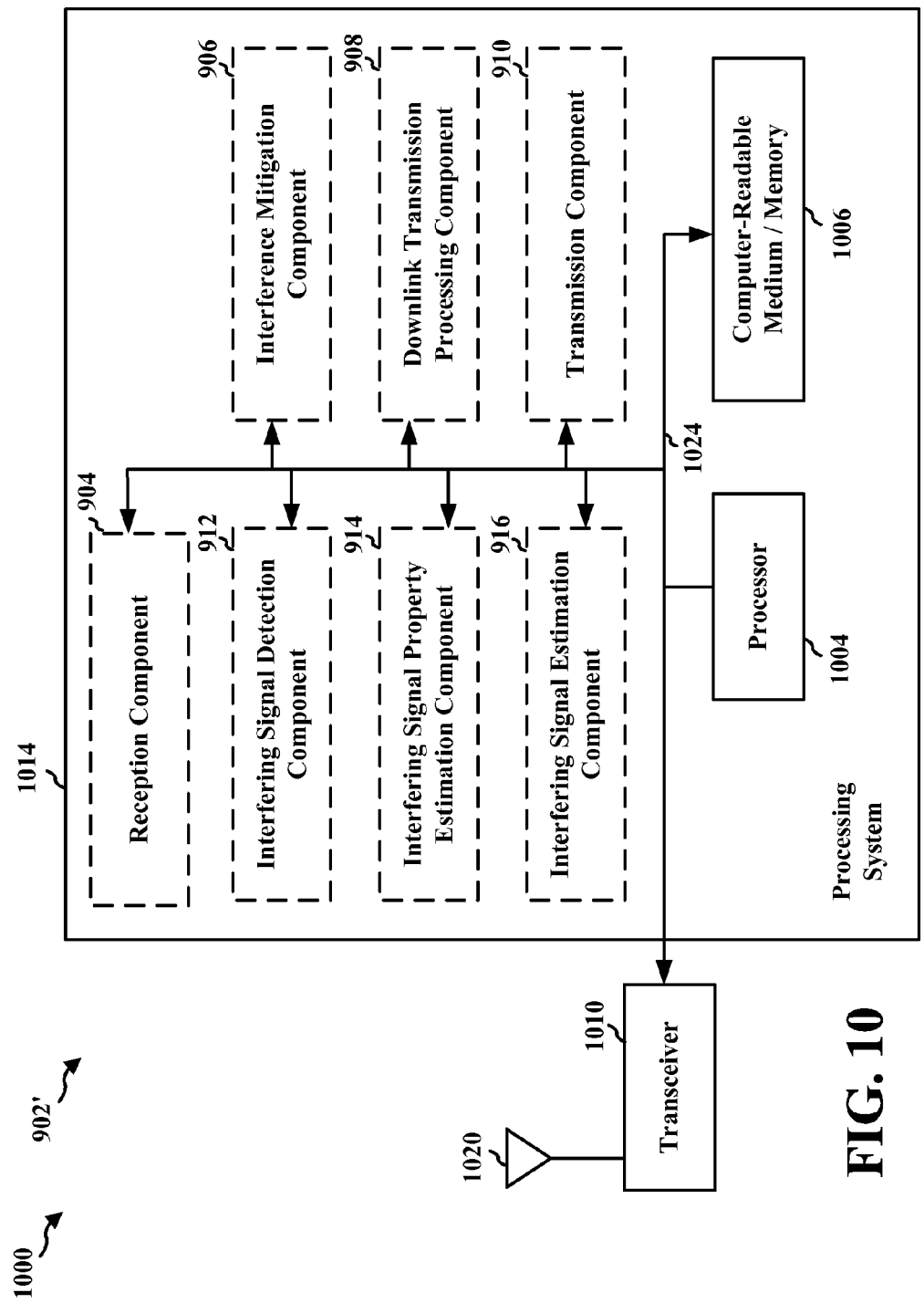
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the components 906, 908, 912, 914, and 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for detecting at least one interfering signal and means for estimating properties of the at least one interfering signal. The properties include at least a type of wireless technology. The apparatus further includes means for transmitting information indicating the properties of each of the at least one interfering signal to a serving eNB. The apparatus may further include means for receiving a downlink assignment for a downlink transmission from the serving eNB. The downlink assignment may be based on the transmitted information. The apparatus may further include means for receiving a configuration for measuring interference. The configuration may be based on the transmitted information. The apparatus may further include means for receiving a downlink transmission from the serving eNB, and means for processing the downlink transmission based on the estimated properties for each of the at least one interfering signal. In one configuration, the apparatus may further include means for receiving a downlink signal. The downlink signal includes a downlink transmission from the serving eNB and the at least one interfering signal. The apparatus may further include means for estimating the at least one interfering signal based on the estimated properties for each of the at least one interfering signal, and means for mitigating interference of the at least one interfering signal from the downlink transmission based on the estimated at least one interfering signal (which may be based on the estimated properties for each of the at least one interfering signal). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
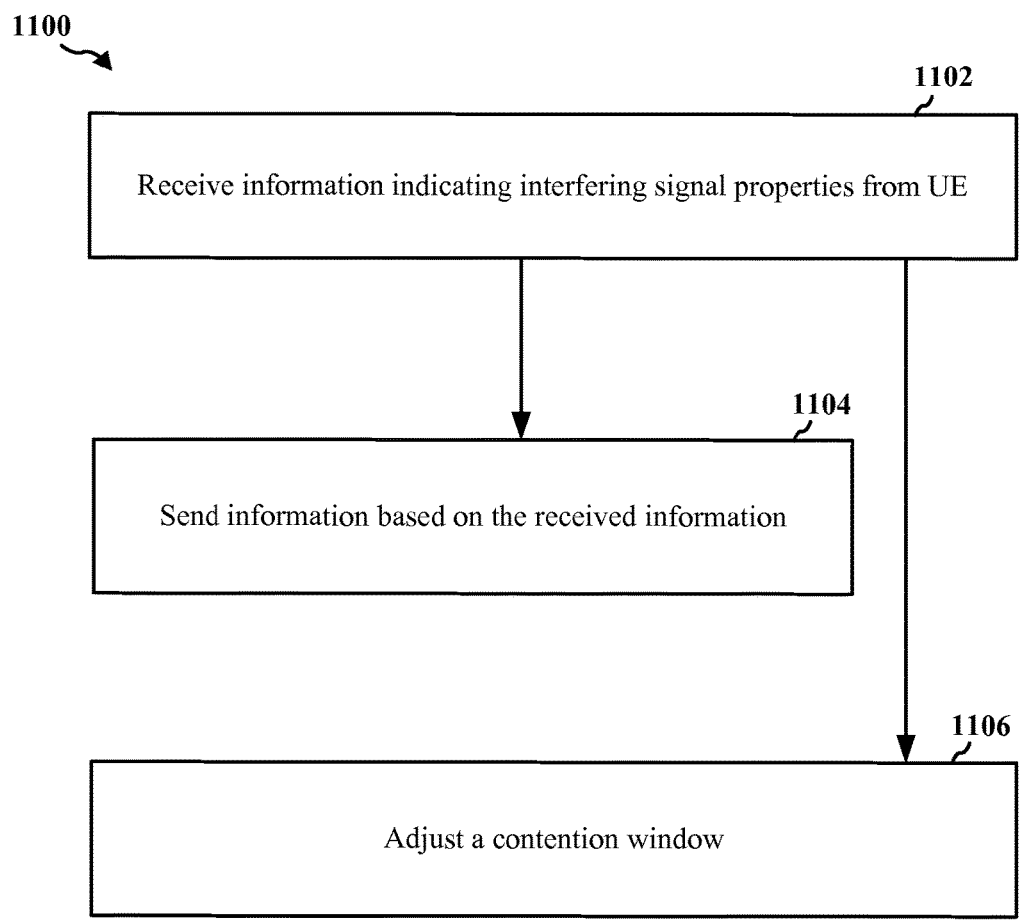
FIG. 11 is a flow chart of another method of wireless communication.

FIG. 11 is a flow chart 1100 of a method of wireless communication. The method may be performed by an eNB (e.g., the serving eNB 518, 618). At 1102, information indicating interfering signal properties may be received from the UE. For example, the eNB may receive, from a UE, information indicating properties of each of at least one interfering signal of the UE. Thus, the eNB received information regarding the interfering signal experienced at the UE. The properties may include at least a type of wireless technology. The received information may, for example, indicate at least one of a strength of each of the at least one interfering signal, a periodicity of each of the at least one interfering signal, a bandwidth of each of the at least one interfering signal, or a frequency of each of the at least one interfering signal. In some examples, the interfering signal, such as an LTE-Unlicensed signal or a Wi-Fi signal, may be unknown to the eNB or to the network.

Referring to FIG. 5, for example, the eNB 518 may receive from the UE 502 the determined properties of the interfering signal 524 (e.g., interference levels, properties of the interference, and/or the type of interference such as a type of wireless technology) to the serving eNB 518 (e.g., via signaling 516). The UE 502 may report the number of interferers to the serving eNB 518. The UE 502 may report a strength of the interference, a periodicity (temporal frequency) of the interference, and/or other properties of the interference.

Referring to FIG. 6, for example, the eNB 618 may receive from the UE 602 the information indicating the properties of the interfering signals 650i, 660i, 670i (e.g., interference levels, properties of the interference, and/or the type of interference such as a type of wireless technology) to the serving eNB 618 (e.g., via signaling 616) for improved interference mitigation measures.

At 1104, information may be sent, e.g., to the UE, based on the received information. For example, the eNB may send information to the UE based on the received information indicating the properties of each of the at least one interfering signal. Referring to FIG. 5, the eNB 518 may transmit to the UE 502 (e.g., via the downlink signal 514) a configuration for measuring interference. The configuration may be based on the received information (e.g., of step 702). In some examples, the configuration may be transmitted in a radio resource control (RRC) message indicating interference measurement resources.

Referring to FIG. 6, in one example, the eNB 618 may, based on the reported information indicating the properties of the interfering signals, determine a configuration for measuring interference. For example, for an LTE interfering signal, the interference measurement may be configured for each subframe based on the periodicity of the LTE interfering signal. For a Wi-Fi interfering signal, the interference measurement may be performed more often due to the burst transmissions of the Wi-Fi. The eNB 618 may, for example, configure the interference measurement for each symbol. In one example, the eNB 618 may provide the configuration for measuring interference to the UE 602 via an RRC signaling message. The interference measurement configuration may indicate interference measurement resources (IMRs) and may indicate zero-power channel state information reference signals (ZP-CSI-RS) for performing the interference measurement.

In some examples, the eNB may send information including downlink assignment to the UE. The downlink assignment may be based on the received information (e.g., of step 702). Referring to FIG. 6, for example, the eNB 618 may, based on the reported information indicating the properties of the interfering signals, adjust a downlink assignment to the UE 602 to improve mitigation/cancellation of the interfering signals. For example, the eNB 618 may change frequency resources scheduled for the downlink signal 614 to avoid a bandwidth of an interfering signal. In another example, the eNB 618 may change (e.g., lower) an MCS for the downlink signal 614 for better demodulation/decoding performance in the presence of the interfering signal. The eNB 618 may transmit a downlink assignment to the UE 602 for the downlink signal 614. The downlink assignment may include scheduling and an MCS, one or more of which may be determined by the eNB 618 based on the received properties.

At 1106, a contention window may be adjusted. For example, referring to FIG. 5, the contention window of downlink transmission (e.g., the downlink signal 514) from the serving eNB 518 may be adjusted based on the information on the interfering signal 524 (e.g., the type of interference and/or the type of wireless technology) reported by the UE 502. For example, the eNB 518 may adjust the contention window a certain way if the UE 502 reports a Wi-Fi interference, and may adjust the contention window a different way if the UE 502 reports another LTE-U to optimized performance. In some examples, the UE feedback is incorporated into channel sensing process as well for the determination of contention window length.

Figure 12:
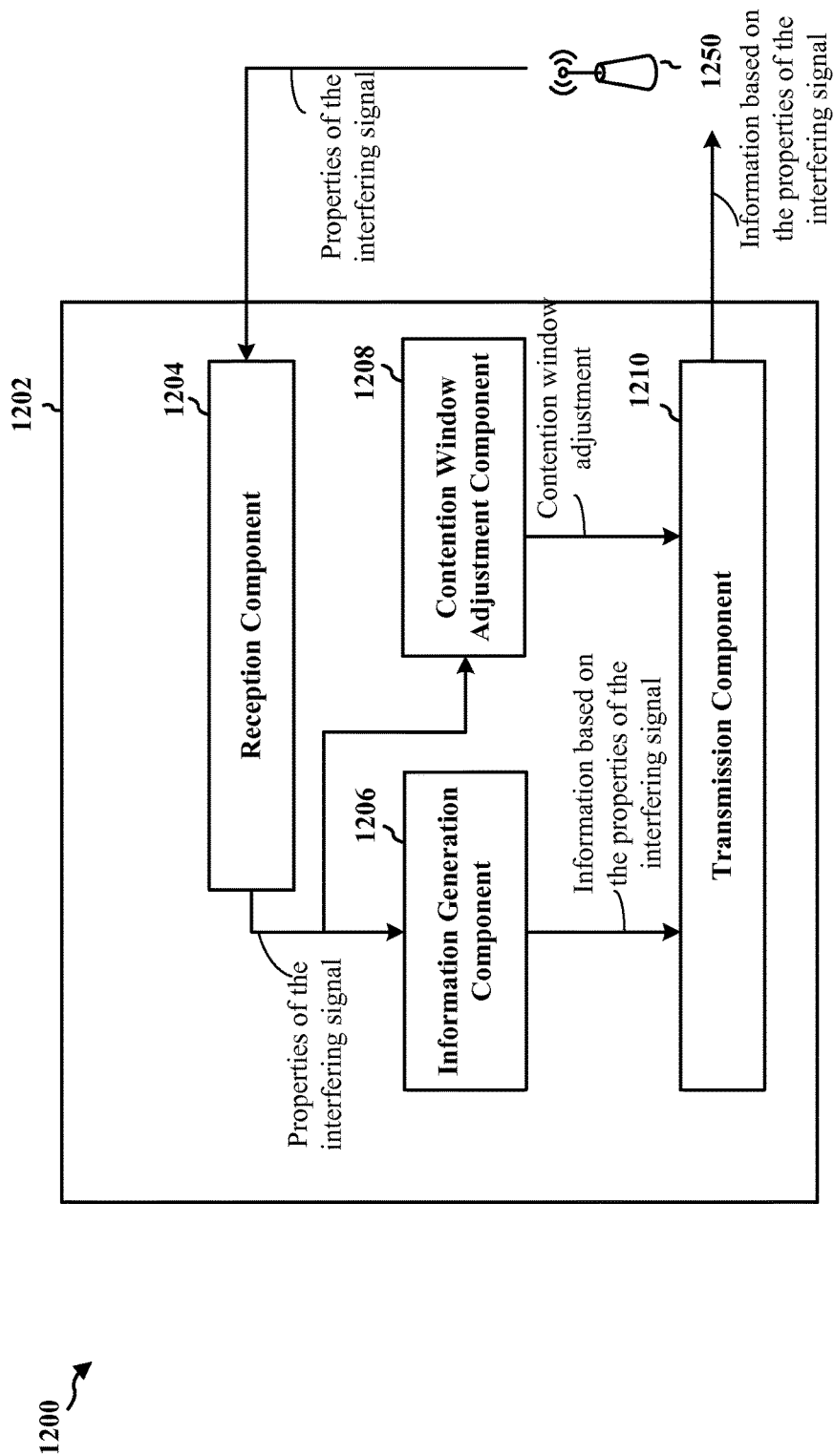
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be an eNB (e.g., the serving eNB 518 or 618). The apparatus includes a reception component 1204, an information generation component 1206, a contention window adjustment component 1208, and a transmission component 1210.

The reception component 1204 receives the properties of the interfering signal from a UE 1250 and provides the information to the information generation component 1206. For example, the reception of the information regarding interfering signal(s) may be similar to that described in connection with FIG. 11. Based on the properties of the interfering signal, the information generation component 1206 generates information (such as the configuration for interference measurements or the scheduling information for a downlink transmission) based on the properties of the interfering signal. The contention window adjustment component 1208 receives the properties of the interfering signal from the reception component 1204, such as the properties of the interfering signal or the type of wireless technology of the interfering signal. Based on the information, the contention window adjustment component 1208 may generate the contention window adjustment (as described in FIG. 11) and provide the adjustment to the transmission component 1210.

The transmission component 1210 transmits the information based on the properties of the interfering signal to the UE 1250 or the contention window operations as described in connection with FIG. 11.

Figure 13:
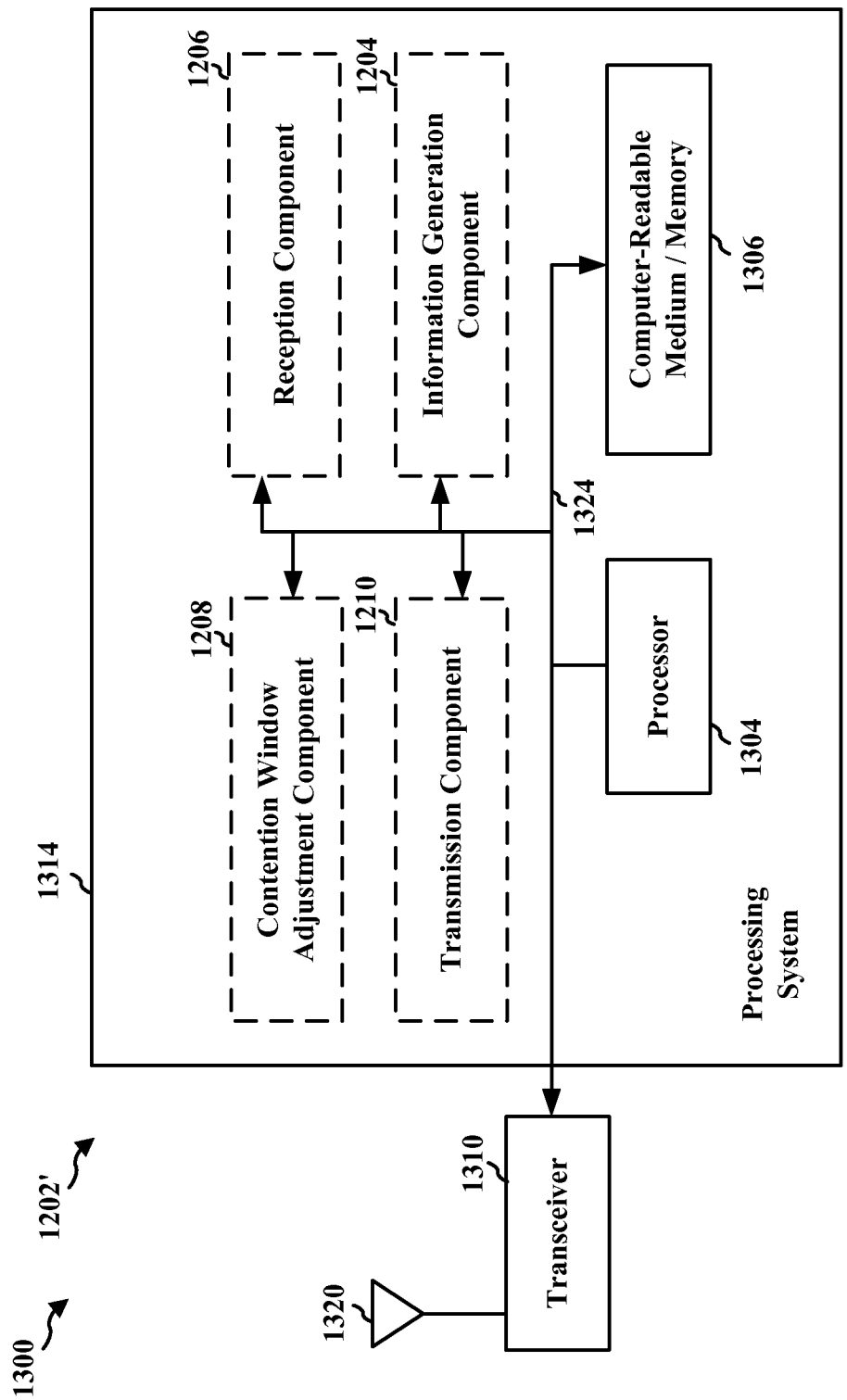
FIG. 13 is a diagram illustrating an example of a hardware implementation for an apparatus employing a processing system.

The apparatus may include additional components that perform each of the blocks of the algorithm in the aforementioned flow charts of FIG. 11. As such, each block in the aforementioned flow charts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1204, 1206, 1208, and 1210. The components may be software components running in the processor 1304, resident/stored in the computer readable medium/memory 1306, one or more hardware components coupled to the processor 1304, or some combination thereof. (Include if invention resides in eNB) The processing system 1314 may be a component of the eNB 310 and may include the memory 376 and/or at least one of the TX processor 316, the RX processor 370, and the controller/processor 375.

In one configuration, the apparatus 1202/1202' for wireless communication includes means for receiving, from a UE, information indicating properties of each of at least one interfering signal of the UE. The properties may include at least a type of wireless technology. The apparatus further includes means for sending information to the UE based on the received information indicating the properties of each of the at least one interfering signal. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   detecting at least one interfering signal;
   determining properties of the at least one interfering signal by estimating from interference detected from the at least one interfering signal and matching the detected interference with known patterns of interferences, the properties including at least a classification of the at least one interfering signal as being in accordance with a Wi-Fi wireless technology or a Long Term Evolution (LTE) wireless technology;
   transmitting information indicative of properties of each of the at least one interfering signal to a serving base station;
   receiving a downlink transmission from the serving base station; and
   processing the downlink transmission based on the determined properties for each of the at least one interfering signal.

2. The method of claim 1, wherein properties of the at least one interfering signal comprise information regarding the type of wireless radio access technology.

3. The method of claim 1, wherein the transmitted information further indicates at least one of a strength of each of the at least one interfering signal, a periodicity of each of the at least one interfering signal, a bandwidth of each of the at least one interfering signal, or a frequency of each of the at least one interfering signal.

4. The method of claim 1, further comprising receiving a downlink assignment for the downlink transmission from the serving base station, wherein the downlink assignment is based, at least in part, on the transmitted information.

5. The method of claim 1, further comprising receiving a configuration for measuring interference, the configuration being based on the transmitted information.

6. The method of claim 5, wherein the configuration for measuring interference is received in a radio resource control (RRC) message indicating interference measurement resources.

7. The method of claim 1, further comprising:
   receiving a downlink signal, the downlink signal comprising the downlink transmission from the serving base station and the at least one interfering signal, wherein processing the downlink transmission comprises mitigating interference of the at least one interfering signal from the downlink transmission based on the determined properties for each of the at least one interfering signal.

8. An apparatus for wireless communication, comprising:
a memory; and
at least one processor coupled to the memory and configured to:
   detect at least one interfering signal;
   determine properties of the at least one interfering signal by estimating from interference detected from the at least one interfering signal and matching the detected interference with known patterns of interferences, the properties including at least a classification of the at least one interfering signal as being in accordance with a Wi-Fi wireless technology or a Long Term Evolution (LTE) wireless technology;
   transmit information indicative of properties of each of the at least one interfering signal to a serving base station;
   receive a downlink transmission from the serving base station; and
   process the downlink transmission based on the determined properties for each of the at least one interfering signal.

9. The apparatus of claim 8, wherein properties of the at least one interfering signal comprise information regarding the type of wireless radio access technology.

10. The apparatus of claim 8, wherein the transmitted information further indicates at least one of a strength of each of the at least one interfering signal, a periodicity of each of the at least one interfering signal, a bandwidth of each of the at least one interfering signal, or a frequency of each of the at least one interfering signal.

11. The apparatus of claim 8, wherein the at least one processor is further configured to receive a downlink assignment for the downlink transmission from the serving base station, wherein the downlink assignment is based, at least in part, on the transmitted information.

12. The apparatus of claim 8, wherein the at least one processor is further configured to receive a configuration for measuring interference, the configuration being based on the transmitted information.

13. The apparatus of claim 12, wherein the at least one processor is further configured to receive the configuration for measuring interference in a radio resource control (RRC) message indicating interference measurement resources.

14. The apparatus of claim 8, wherein the at least one processor is further configured to:
 receive a downlink signal, the downlink signal comprising downlink transmission from the serving base station and the at least one interfering signal, wherein processing the downlink transmission comprises mitigating interference of the at least one interfering signal from the downlink transmission based on the determined properties for each of the at least one interfering signal.

* * * * *